May 30, 1961  J. M. HANSERD  2,986,616
SAFETY ELEVATION SWITCH FOR TRACTORS
Filed Dec. 2, 1958

INVENTOR.
JAMES M. HANSERD
BY Joseph B. Lindecker
ATT'Y.

United States Patent Office 2,986,616
Patented May 30, 1961

2,986,616
SAFETY ELEVATION SWITCH FOR TRACTORS
James M. Hanserd, 1815 Cedar St., Van Buren, Ark.
Filed Dec. 2, 1958, Ser. No. 777,698
4 Claims. (Cl. 200—61.52)

This invention relates to electrical switches and more particularly to an adjustable mercury switch for controlling the ignition system of a tractor in response to a predetermined degree or angle of tilt of the vehicle.

Tractors of the wheel type, as distinguished from the track or caterpillar type, have a tendency to elevate at the front end and rotate about the rear axle when the tractor is connected to a load that is too heavy to be pulled. A tractor overturns so quickly that sometimes the tractor driver does not have sufficient time to escape from the falling tractor, thereby resulting in injury or death.

It is therefore an object of the present invention to provide a safety switch of the mercury type that may be adjusted to control the ignition system of a tractor in response to the raising of the forward end beyond a predetermined angle.

A further object of the present invention is to provide an adjustable ignition switch for tractors for automatically shorting out the ignition system in response to the inclination of the front end of the tractor beyond a predetermined point along the longitudinal central plane or to either side thereof.

Another object of the present invention is to provide a safety switch of the above type that is very sensitive to all vehicle movements and which will automtically cut out the tractor engine before any damage can result.

Other objects of the invention are to provide an adjustable electrical switch for tractors bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
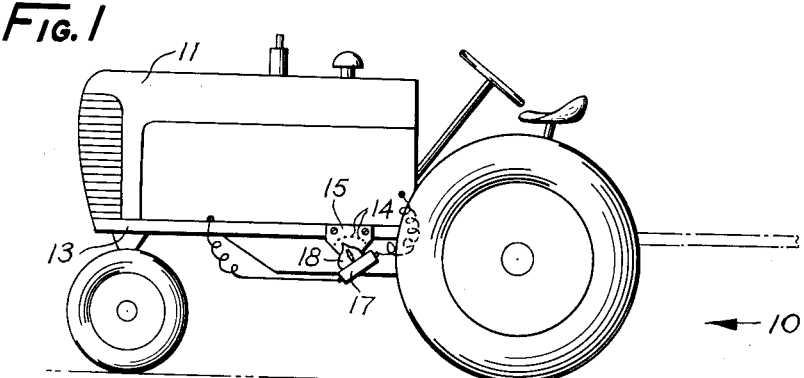
Figure 1 is a side elevational view of a tractor having a safety switch made in accordance with the present invention.
Figure 2:
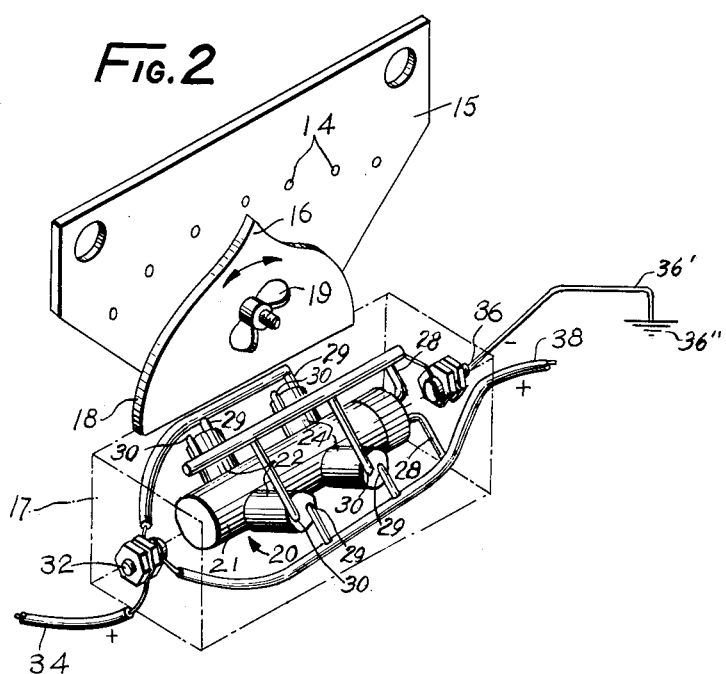
Figure 2 is an enlarged perspective view of the switch assembly shown in Figure 1.

Referring now to the drawing, a tractor 10 embodying a safety switch made in accordance with the present invention is shown to include an engine compartment 11 at the front end of the vehicle supported upon a longitudinal frame assembly 13. The frame 13 is also provided with a downwardly depending bracket plate 15 upon which the switch housing 17 is adjustably supported through the engagement of a securement flange 18 thereof with the bracket 15. A wing nut and bolt 19 associated with the bracket and flange provides means for securing the housing 17 in any desired angular position relative to the horizontal plane of the vehicle, as indicated by the pointer 16 relative to the marks 14 on the plate 15.

The switch housing 17 completely encloses a mercury type switch 20 that is provided with a longitudinal main body portion 21 and arms 22, 24 of V-shaped portions at the front and rear extremities thereof, respectively. The rear extremity of the body 21 is provided with contacts 28, while each extremity of the arms of the front V-shaped portion is also provided with similar contacts 29, 30, respectively. It will thus be recognized that the engagement of a small ball of mercury contained within the switch housing 21 within any one set of the aforementioned contacts is operative to electrically close the circuit therethrough.

One lead 29 of each of the V-shaped arms 22, and one contact 28 of the rear end of the switch body 21 are connected to the rearward terminal 38, or positive conductor and to a forward terminal post 32 that has a further lead 34 connected into the ignition circuit of the tractor. The other conductor 30 of each of the V-shaped arms 22 and the other conductor 28 of the rear end of the switch body 21 are connected to a rear terminal negative ground post 36 that is connected to the ground wire 36'. A manually operated switch 40 in series with the gravity operated switch 20 and the storage battery 42 of the ignition circuit may be opened to disconnect the gravity switch whenever desired.

Figure 3:
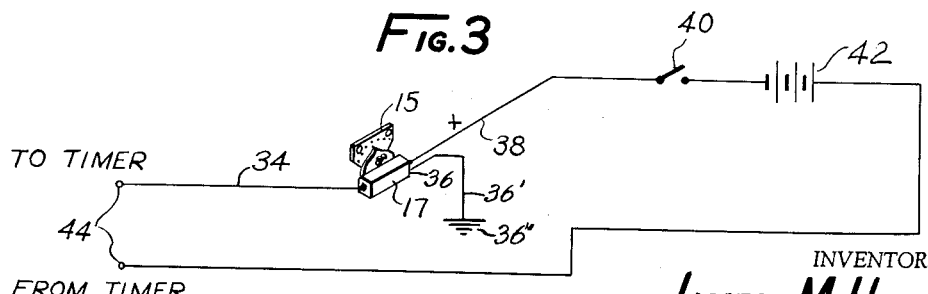
Figure 3 is a schematic electrical diagram of the switch end ignition circuit of the tractor shown in Figure 1.

With the switch in the circuit, as shown in Figure 3, with the manual switch 40 closed, the battery 42 supplies electrical energy to the ignition control terminals 44 of the timer, or the like. As soon as the vehicle is tilted beyond the predetermined position in which the body 21 of the switch achieves a horizontal position, the ball of mercury will close the circuit through one of the conductors 29 or conductor 28 at the rear end of the switch body to connect the ignition system to ground, thus shorting it out and deenergizing the spark plugs of the tractor, whereby it will not be permitted to turn over. The same result is achieved when the vehicle tilts about a longitudinal axis sufficiently to cause the contacts 29, 30 at either side of the switch body to short out the ignition system in a similar manner.

While various changes may be made in the detail construction, it shall be understood that such changes shall be within the spirit and scope of the present invention as defined by the appended claims.

What I claim as new and desire to protect by Letters Patent of the United States is:

1. An electrical elevational safety switch for tractors comprising, in combination, a base plate for mounting upon a tractor under frame, a switch box supported upon said plate for adjustable rotation about a horizontal axis, a mercury switch supported within said switch box, said mercury switch comprising a longitudinal main body, a ball of mercury disposed within said main body, said longitudinal main body having V-shaped portions extending upwardly and outwardly from each longitudinal extremity thereof, said main body and said V-shaped portions being of hollow construction, positive and negative electrical contact means forming part of the ignition circuit of the tractor associated with the rear longitudinal extremity of said main body and the outer end of each V-shaped portion, the engagement of said ball of mercury with said electrical contact means at said rear extremity of said main body being operative to ground said ignition circuit, and the engagement of said ball of mercury with said electrical contact means at the outer ends of each V-shaped portion being operative to ground said ignition circuit; whereby the switch responds to upward elevation of the forward end of said main body to ground the current, and further responds to transverse side tipping of the V-shaped portions to ground the current normally sent to the engine timer.

2. An automatic electric circuit shut-off for tractors adapted to be connected to the tractor and arranged to the rear of the forward wheels thereof, comprising a base plate for mounting upon a tractor, a mercury switch supported upon said plate for rotation about a horizontal axis, said mercury switch comprising a longitudinal main body with a ball of mercury disposed therein, said longitudinal main body having V-shaped portions extending upwardly and outwardly therefrom, said main body and said V-shaped portions being tubular and internally joined with each other, positive and negative electrical contact means forming part of an ignition circuit associated with the rear end of said main body, positive and negative means associated with each of said outermost extremities of said V-shaped portions, said ball of mercury adapted to ground the positive and negative electrical contacts in the rear end of said main body and stop the engine of the tractor when the front wheels thereof raise from the ground; and said ball of mercury adapted to ground any of the other positive and negative contacts in the V-shaped portions when the V-shaped portions are tipped sideways and downwardly.

3. The combination according to claim 2, wherein said mercury switch embodies means for setting it so the disconnecting means will operate at different levels.

4. The combination according to claim 3, wherein said mercury switch is removably connected with said base plate.

References Cited in the file of this patent
UNITED STATES PATENTS

| | | |
|---|---|---|
| 1,633,386 | Rutledge | June 21, 1927 |
| 2,453,783 | Claypool | Nov. 16, 1948 |
| 2,757,749 | Cooper et al. | Aug. 7, 1956 |
| 2,870,280 | Kraus | Jan. 7, 1959 |